United States Patent
Kaji

(10) Patent No.: US 6,609,220 B2
(45) Date of Patent: Aug. 19, 2003

(54) METHOD OF MANUFACTURING Q-VALUE AND DEVICE THEREFOR

(75) Inventor: Masanori Kaji, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 10/274,137

(22) Filed: Oct. 21, 2002

(65) Prior Publication Data

US 2003/0065993 A1 Apr. 3, 2003

Related U.S. Application Data

(63) Continuation of application No. 09/406,206, filed on Sep. 28, 1999, now abandoned.

(30) Foreign Application Priority Data

Sep. 30, 1998 (JP) .......................................... 10-294569

(51) Int. Cl.[7] .............................................. G06F 11/00
(52) U.S. Cl. ...................................... 714/704; 714/705
(58) Field of Search ................................ 714/704, 705, 714/708; 375/340; 391/161; 359/110, 173

(56) References Cited

U.S. PATENT DOCUMENTS

| 5,442,655 A | * | 8/1995 | Dedic et al. | ................. 375/340 |
| 5,585,954 A | * | 12/1996 | Taga et al. | ................. 359/158 |
| 5,652,668 A | * | 7/1997 | Aulet et al. | ................. 359/110 |
| 5,764,651 A | * | 6/1998 | Bullock et al. | ............. 714/708 |
| 6,229,631 B1 | * | 5/2001 | Sato et al. | ................... 359/110 |
| 6,252,692 B1 | * | 6/2001 | Roberts | ....................... 359/173 |
| 6,320,687 B1 | * | 11/2001 | Ishikawa | ..................... 359/161 |

OTHER PUBLICATIONS

Neal S. Bergano, F.W. Kerfoot, and C.R. Davidson, "Margin Measurements in Optical Amplifier Systems," IEEE Photonics Technology Letters, vol. 5, No. 3, Mar. 1993, pp. 304–306.*

* cited by examiner

*Primary Examiner*—David Ton
(74) *Attorney, Agent, or Firm*—Finnegan, Henderson, Farabow, Garrett & Dunner LLP

(57) ABSTRACT

A method of measuring a Q-value according to a mean value and standard deviation of a signal level distribution of input data comprises: a first step for calculating a difference between bit error rates of input data sampled by a plurality of threshold values which are a little different from each other; a second step for calculating a difference between the difference data obtained in the first step; and a third step (steps 118 and 120) for calculating a mean value and standard deviation of the signal level of input data when data obtained in the first and the second step (steps 100 to 116) are utilized.

8 Claims, 6 Drawing Sheets

METHOD OF MANUFACTURING Q-VALUE AND DEVICE THEREFOR

This is a continuation of application Ser. No. 09/406,206, filed Sep. 28, 1999 abandoned, and claims priority under 35 U.S.C. §119 to Japanese Patent Application No. 10-294569, filed on Sep. 30, 1998, all of which are incorporated herein by reference.

BACKGROUND OF THE INVENTION

1. Field of the Invention

The present invention relates to a method and device of measuring a Q-value. More particularly, the present invention relates to a method and device for measuring a Q-value in which the Q-value is calculated from a bit error rate distribution.

2. Description of the Related Art

In a digital receiver, an input signal level is compared with a threshold value at each discrimination time in a discrimination decision circuit, and "1" (there is a signal pulse) and "0" (there is no signal pulse) are determined as data showing the existence of a signal pulse. A signal level received by this digital receiver sways by the influence of noise. Therefore, a distribution of the signal level can be expressed by a probability density function. As shown in FIG. 4, marks are defined as follows. A mean value of the signal level of "1" after receiving is $\mu_1$, standard deviation is $\sigma_1$, a mean value of the signal level of "0" after receiving is $\mu_0$, and standard deviation is $\sigma_0$. In this case, it is assumed that the probability density function is a Gaussian distribution. At this time, a threshold value level in the discrimination decision circuit is represented by D. Then, a bit error rate BER (D) is given by the following Formula 1.

$$BER(D) = \frac{1}{2}\left\{erfc\left(\frac{\mu_1 - D}{\sigma_1}\right) + erfc\left(\frac{D - \mu_0}{\sigma_0}\right)\right\} \quad (1)$$

In this case, erfc( ) is a complementary error function and defined by the following Formula 2.

$$erfc(x) = \frac{1}{\sqrt{2\pi}} \int_x^\infty e^{-\frac{\beta^2}{2}} d\beta \quad (2)$$

However, in a region in which bit error rate BER(D) is low, it is actually difficult to detect an error in a predetermined measurement time. For example, as shown in [Neal S. Bergano et al., "Margin Measurements in Optical Amplifier System", IEEE PHOTONICS TECHNOLOGY LETTERS, Vol.5, No.3, March 1993], a ratio of signal to noise (SNR) of a system is evaluated by a Q-value. The Q-value is defined by the following Formula 3.

$$Q = \frac{\mu_1 - \mu_0}{\sigma_1 - \sigma_0} \quad (3)$$

In order to calculate the Q-value by a bit error rate distribution of input data sampled when threshold value level D is changed as described above, conventionally, it is necessary to conduct a calculation in which an inverse function is used.

FIG. 5 is a view showing an arrangement of a conventional Q-value measurement device in which the Q-value is calculated by the bit error rate distribution. In FIG. 5, the Q-value measurement device includes: a discriminating section 10, bit error rate measurement section 20, memory 30, and calculating section 40. The discriminating section 10 includes an amplitude comparator 12 and a data flip-flop (D-FF) 14. The Q-value is measured by this device as follows. A level of the input signal 1$a$ is compared with a level 1$b$ of the threshold value by the amplitude comparator 12, and the comparative output 2$a$ is sampled by the data flip-flop (D-FF) 14 in accordance with the time of the clock signal 1$c$. According to the signal 3$a$ which has been sampled, the bit error rate measuring section 20 measures a bit error rate and outputs a bit error rate 4$a$. The bit error rate 4$a$ is accommodated in the memory 30 together with the threshold value level 1$b$.

On the other hand, the calculating section 40 calculates a Q-value by the procedure shown in FIG. 6. In this case, a row of data of the bit error rates accommodated in the memory 30 is (D1,BER(D1)), (D2,BER(D2)), (D3,BER(D3)), ..., and (DN,BER(DN)), the number of which is N, wherein $\mu_0 \leq D1 < D2 < D3 \ldots < DN \leq \mu_1$. At first, in n=1, 2, 3, ..., N, the minimum value BERmin of BER(Dn) is found.

Next, an inverse function erfc−1( ) of the complementary error function is developed in series by degree m (step 52). While n is being increased from 1 (steps 54 and 62), erfc−1 (2BER(DN)) is calculated (step 56) until the bit error rate becomes BER(DN)=BERmin (step 58). Then, it is accommodated in the memory 30 together with DN (step 60). In the above case, it is utilized that Formula 1 can be approximated to Formula 4 in the case where $\mu_0 \leq DN \ll \mu_1$.

$$BER(D) \approx \frac{1}{2} erfc\left(\frac{D - \mu_0}{\sigma_0}\right) \quad (4)$$

Further, the following Formula 5 is obtained from Formula 4.

$$D = \sigma_0 erfc^{-1}\{2BER(D)\} + \mu_0 \quad (5)$$

Therefore, from data (erfc−1(2BER(DN)),DN) (n=1, 2, 3, ...) accommodated in the memory 30 in step 60, a mean value $\mu_0$ of the level "0" and standard deviation $\sigma_0$ in the input data are determined by the method of least squares (step 64).

In the same manner as that described above, in steps 66 to 78, a mean value $\mu_1$ of the level "1" and standard deviation $\sigma_1$ in the input data are determined. Finally, by Formula 3, which is a defining formula of the Q-value, the Q-value is calculated (step 80).

As described above, by the conventional Q-value measuring device, a calculation of sum of products is conducted by a plurality of times at the maximum, the number of which is (2×m×N), in the two loops in the flow shown in FIG. 6.

In the above conventional Q-value measurement device, in order to enhance the accuracy of measurement, when the inverse function of the complementary error function is subjected to series development, it is necessary to increase the degree m of series development, and further in order to judge the existence of an input signal, it is necessary to reduce the interval of the threshold value level D, that is, it is necessary to increase N. Therefore, the following problems may be encountered in the conventional Q-value measurement device. When the accuracy of measurement of the Q-value is enhanced, the number of times for the calculation of a sum of products, which is necessary for the measurement of the Q-value, is remarkably increased, and it takes time to calculate the Q-value.

SUMMARY OF THE INVENTION

The present invention has been accomplished to solve the above problems. It is a first object of the present invention to provide a method of measuring a Q-value in which the Q-value can be measured by a small number of times of calculation without directly using the inverse function of the complementary error function.

It is a second object of the present invention to provide a device of measuring a Q-value by which the Q-value can be quickly measured when the Q-value measurement method of the present invention is carried out.

In order to accomplish the first object of the present invention, according to a first aspect of the invention, there is provided a method of measuring a Q-value according to a mean value and standard deviation of a signal level distribution of input data comprising: a first step for calculating a difference between bit error rates of input data sampled by a plurality of threshold values which are a little different from each other; and a second step for further calculating a difference between the difference data obtained in the first step.

According to a second aspect of the invention, there is provided a method of measuring a Q-value according to a mean value and standard deviation of a signal level distribution of input data comprising: a first step for calculating a difference between bit error rates of input data sampled by a plurality of threshold values which are a little different from each other; a second step for further calculating a difference between the difference data obtained in the first step; and a third step for calculating a mean value and standard deviation of the signal level of input data when data obtained in the first and the second step is utilized.

According to a third aspect of the invention, there is provided a method of measuring a Q-value according to a mean value and standard deviation of a signal level distribution of input data comprising: a first step for calculating a difference between bit error rates of input data sampled by a plurality of threshold values which are a little different from each other; a second step for calculating a difference between the difference data obtained in the first step; and a third step for calculating a mean value and standard deviation of the signal level of input data by the method of least squares when data obtained in the first and the second step are utilized.

According to a fourth aspect of the invention, there is provided a method of measuring a Q-value according to a mean value and standard deviation of a signal level distribution of input data comprising: a first step for calculating a difference between bit error rates of input data sampled by a plurality of threshold values which are a little different from each other when a standard deviation of input data of level "0" and a standard deviation of input data of level "1" are equal to each other in the signal level distribution of input data; a second step for further calculating a difference between the difference data obtained in the first step; and a third step for calculating a mean value and standard deviation of the signal level of input data by solving simultaneous linear equations of two variables when data obtained in the first and the second step are utilized.

According to the invention, the mean value and standard deviation of the input signal level are calculated from the measured bit error rate distribution by conducting a difference calculation between the data of measurement of the bit error rate without using the inverse function of the complementary error function. Accordingly, it is possible to reduce the number of times of calculation. Therefore, the measurement of the Q-value can be quickly carried out.

In order to accomplish the second object of the present invention, according to a fifth aspect of the invention, there is provided a device of measuring a Q-value according to a mean value and standard deviation of a signal level distribution of input data comprising: an input data discrimination means for sampling input data by a plurality of threshold levels which are a little different from each other; a bit error rate measuring means for measuring a bit error rate of input data according to a sampling output of the input data discrimination means; and a calculation means for taking in bit error rates of input data measured by the bit error rate measuring means, for calculating a difference between the bit error rates and for calculating a difference between the thus calculated difference data.

According to a sixth aspect of the invention, there is provided a device of measuring a Q-value according to the fifth aspect of the invention, wherein the calculation means calculates a difference between the error rates of input data, further calculates a difference between the calculated difference data, and calculates a mean value and standard deviation of the signal level distribution of input data by utilizing the difference data and also by utilizing the data obtained when the difference data is subjected to difference calculation.

According to a seventh aspect of the invention, there is provided a device of measuring a Q-value according to claim 5, wherein the calculation means calculates a difference between the error rates of input data, further calculates a difference between the calculated difference data, and calculates a mean value and standard deviation of the signal level distribution of input data by the method of least squares by utilizing the difference data and also by utilizing the data obtained when the difference data is subjected to difference calculation.

According to an eighth aspect of the invention, there is provided a device of measuring a Q-value according to a mean value and standard deviation of a signal level distribution of input data comprising: an input data discrimination means for sampling input data by a plurality of threshold levels which are a little different from each other; a bit error rate measuring means for measuring a bit error rate of input data according to a sampling output of the input data discrimination means; and a calculation means for taking in bit error rates of input data measured by the bit error rate measuring means, for calculating a difference between bit error rates of input data sampled by a plurality of threshold values which are a little different from each other when a standard deviation of input data of level "0" and a standard deviation of input data of level "1" are equal to each other in the signal level distribution of input data, for calculating a difference between the obtained difference data, and for calculating a mean value and standard deviation of the signal level distribution of input data by solving simultaneous linear equations by utilizing the difference data and also by utilizing the data obtained when the difference data is subjected to difference calculation.

According to the invention, the method of measuring a Q-value of the present invention is used. Accordingly, it is possible to reduce the number of times of calculation. Therefore, the measurement of the Q-value can be quickly carried out.

DETAILED DESCRIPTION OF THE PREFERRED EMBODIMENTS

Figure 5:
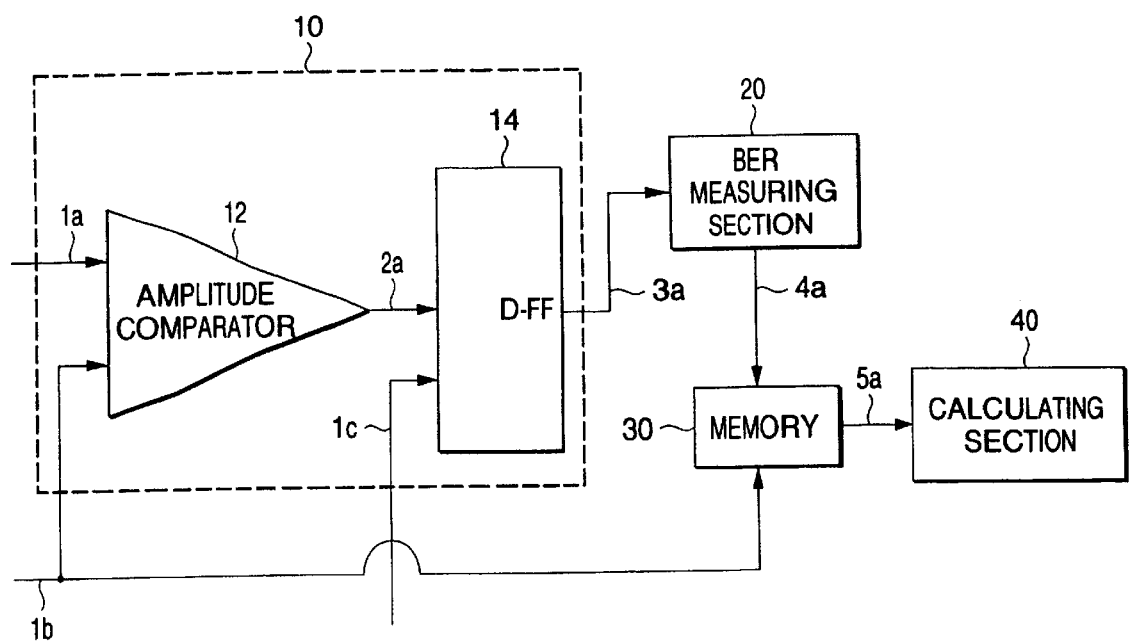
FIG. 5 is a block diagram showing the structure of a conventional device of measuring the Q-value.
Figure 6:
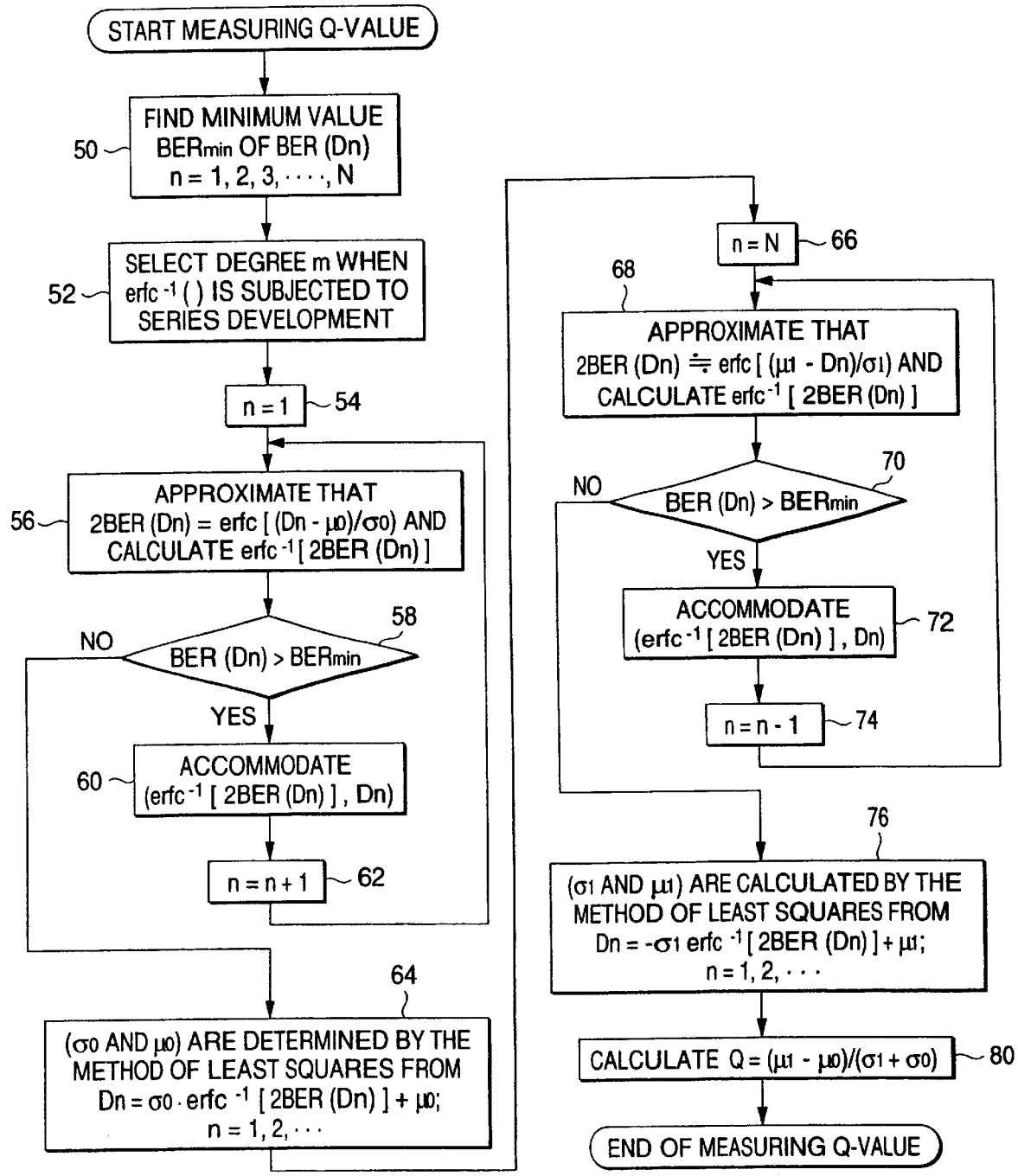
FIG. 6 is a flow chart showing the content of processing of the device of measuring the Q-value shown in FIG. 5.

Referring to the appended drawings, an embodiment of the present invention will be explained in detail. Although the content of processing conducted in the calculating section of the device of measuring the Q-value of the first embodiment of the present invention is different from that of the conventional device, the structure shown in the block diagram is the same as that of the conventional device of measuring the Q-value shown in FIG. 5. Therefore, the device of measuring the Q-value of this embodiment will be explained according to FIG. 5.

The Q-value measurement device of the first embodiment of the present invention includes: a discriminating section 10 for sampling input data by a plurality of threshold levels which are a little different from each other; a bit error rate measuring section 20 for measuring a bit error rate of input data according to a sampling output of the discriminating section 10; a memory 30 for storing a bit error rate and a threshold value level of input data measured by the bit error rate measuring section 20; and a calculating section 40 for reading out the bit error rate and the threshold value level stored in the memory 30 and for calculating a difference between the bit error rates and for calculating a difference between the thus calculated difference data.

The discriminating section 10 includes an amplitude comparator 12 and a data flip-flop (D-FF) 14. In this connection, the discriminating section 10 corresponds to the input data discriminating means of the present invention. The bit error rate measuring means 20 corresponds to the bit error rate measuring means of the present invention. The calculating means 40 corresponds to the calculation means of the present invention.

Measurement of the Q-value is conducted by the device of measuring the Q-value of this embodiment as follows. First, the level of the input signal 1a is compared with the threshold value level 1b by the amplitude comparator 12, and the comparative output 2a is sampled by the data flip-flop (D-FF) 14 at the time of the clock signal 1c. The bit error measuring section step 20 measures a bit error rate according to the sampled signal 3a and outputs a bit error rate 4a. The bit error rate 4a is stored in the memory 30 together with the threshold level 1b.

On the other hand, the calculating section 40 reads out a row of data, which are stored in the memory 30, (D1,BER(D1)), (D2,BER(D2)), (D3,BER(D3)), ..., and (DN,BER(DN)), the number of which is N, wherein $\mu 0 \leq D1 < D2 < D3 \ldots < DN \leq \mu 1$. In the above data, the threshold value level Dn and the bit error rate BER(Dn) (n=1, 2, ..., N) form a pair. In order to measure the Q-value, calculation is conducted on the data by the procedure shown in FIG. 1. First, in step 100, difference $\Delta Gn0$ is defined according to the following Formulas 6 and 7.

$$\Delta Gn0 \equiv \frac{\ln F(n+1)0 - \ln Fn0}{D(n+1) - Dn} \quad (6)$$

$$Fn0 \equiv -\frac{BER(D(n+1)) - BER(Dn)}{D(n+1) - Dn} \quad (7)$$

In the same manner, in step 102, difference $\Delta Gn1$ is defined according to the following Formulas 8 and 9.

$$\Delta Gn1 \equiv \frac{\ln F(n+1)1 - \ln Fn0}{D(n+1) - Dn} \quad (8)$$

$$Fn1 \equiv \frac{BER(D(n+1)) - BER(Dn)}{D(n+1) - Dn} \quad (9)$$

While n is being increased from 1 to N−2 (steps 104, 114 and 116), when Fn0>0 and F(n+1)0>0, data ($\Delta Gn0$, (D(n+1)+Dn)/2) is stored in the memory 30 in step 108, and when Fn1>0 and F(n+1)1>0, data ($\Delta Gn1$, (D(n+1)+Dn)/2) is stored in the memory 30 in step 112. From the data ($\Delta Gn0$, (D(n+1)+Dn)/2) (n=1, 2, 3, ...), which are stored in the memory 30, $-\sigma 0^2$ and $\mu 0$ are determined by the method of least squares (step 118).

In the same manner, $-\sigma 1^2$ and $\mu 1$ are determined from ($\Delta Gn1$,(D(n+1)+Dn)/2) (n=1, 2, 3, ...) (step 120). Next, the Q-value is calculated by Formula 3 which is a defining formula (step 122).

Figure 1:
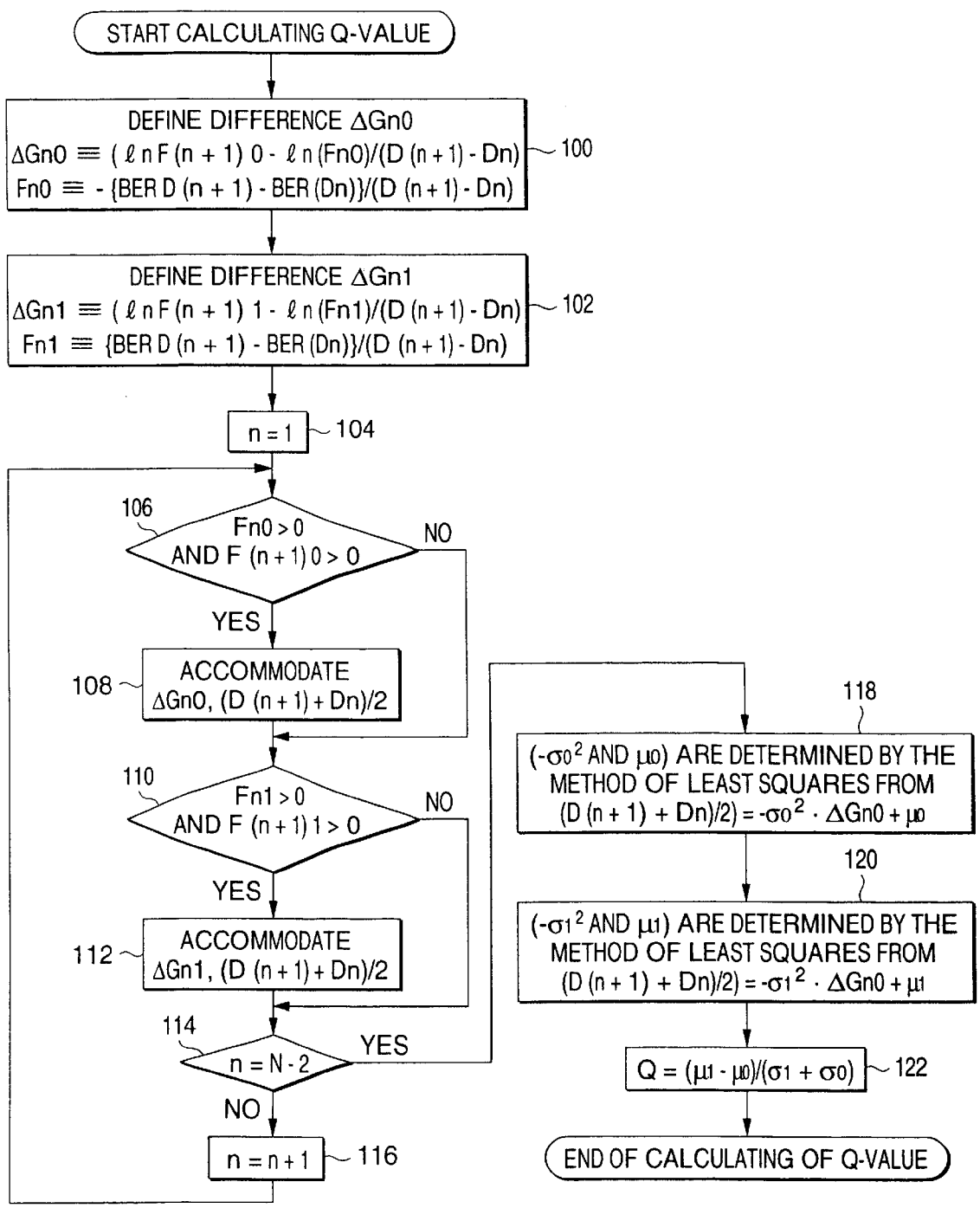
FIG. 1 is a flow chart showing the content of processing of the device of measuring the Q-value of the first embodiment of the present invention.

As described above, in steps 106 to step 116 shown in the flow chart of FIG. 1, calculation of a sum of products, the number of times of which is 5×N at most, is conducted, and logarithmic calculation, the number of times of which is 4×N at most, is conducted.

The meaning of difference $\Delta Gn0$ shown in the flow chart of FIG. 1 is described as follows. In order to find mean value $\mu 0$ and standard deviation $\sigma 0$ at the level "0" of input data, Formula 1 is approximated by Formula 4. Further, when both sides of Formula 4 are differentiated by threshold level D, the following formula 10 is obtained.

$$\frac{d}{dD} BER(D) \equiv -\frac{1}{2\sqrt{2\pi} \cdot \sigma_0} \exp\left\{-\frac{1}{2}\left(\frac{D-\mu_0}{\sigma_0}\right)^2\right\} \quad (10)$$

When the logarithms of both sides of Formula 10 are taken, the following Formula 11 is obtained.

$$\ln\left\{-\frac{d}{dD} BER(D)\right\} = -\ln(2\sqrt{2\pi} \cdot \sigma_0) - \frac{1}{2}\left(\frac{D-\mu_0}{\sigma_0}\right)^2 \quad (11)$$

In this case, F0(D) is defined by the following Formula 12.

$$F0(D) \equiv -\frac{d}{dD} BER(D) > 0 \quad (12)$$

Formula 11 becomes Formula 13.

$$\ln F0(D) \equiv -\ln(2\sqrt{2\pi} \cdot \sigma_0) - \frac{1}{2}\left(\frac{D-\mu_0}{\sigma_0}\right)^2 \quad (13)$$

Threshold value level D is changed from a continuous quantity to a discrete quantity Dn (n=1, 2, 3, ..., N) by the measurement. Therefore, when the interval of threshold level D is sufficiently small, Formulas 12 and 13 are respectively changed to Formulas 7 and 14.

$$\ln FnO = -\ln(2\sqrt{2\pi} \cdot \sigma_0) - \frac{1}{2}\left(\frac{Dn - \mu_0}{\sigma_0}\right)^2 \quad (14)$$

The recurrence formula of Formula 14 is Formula 15 described below.

$$\ln F(n+1)0 - \ln FnO = \frac{D(n+1) - Dn}{\sigma_0^2}\left(\mu_0 - \frac{D(n+1) + Dn}{2}\right) \quad (15)$$

When Formula 6, which has been defined before, Formula 15 becomes Formula 16.

$$\frac{D(n+1) + Dn}{2} = -\sigma_0^2 \cdot \Delta GnO + \mu_0 \quad (16)$$

Therefore, from data $(\Delta Gn0, (D(n+1)+Dn)/2)$ (n=1, 2, 3, . . . ), it is possible to determine $-\sigma0^2$ and $\mu 0$ by the method of least squares. In the same manner, in order to find mean value $\mu 1$ and standard deviation $\sigma 1$ at the level "1" of input data, difference $\Delta Gn1$ is defined by Formula 8, and $-\sigma 1^2$ and $\mu 1$ can be determined from the following Formula 17 by the method of least squares.

$$\frac{D(n+1) + Dn}{2} = -\sigma_1^2 \cdot \Delta Gn1 + \mu_1 \quad (17)$$

In this way, mean value $\mu 0$ and standard deviation $\sigma 0$ at the level "0" of input data can be determined, and mean value $\mu 1$ and standard deviation $\sigma 1$ at the level "1" of input data can be also determined. Finally, the Q-value is calculated by Formula 3 which is a defining formula of the Q-value (step 122).

As explained above, according to the device of measuring the Q-value of the first embodiment of the present invention, it is possible to remarkably reduce the number of times of calculation necessary for measuring the Q-value. For example, when $\mu 1 - \mu 0 = 1$ V and (the interval of the threshold value level)=10 mV, the number of data of the threshold levels becomes N=100. In this case, in the conventional Q-value measuring device, when the degree of development of series of the inverse function of the complementary error function is m=10, the number of times of the calculation of a sum of products becomes 2000 at the maximum. On the other hand, in the Q-value measuring device of the first embodiment of the present invention, the number of times of calculation of a sum of products is 500 at most, and the number of times of logarithmic calculation is 400 at most when the Q-value is calculated.

Figure 2:
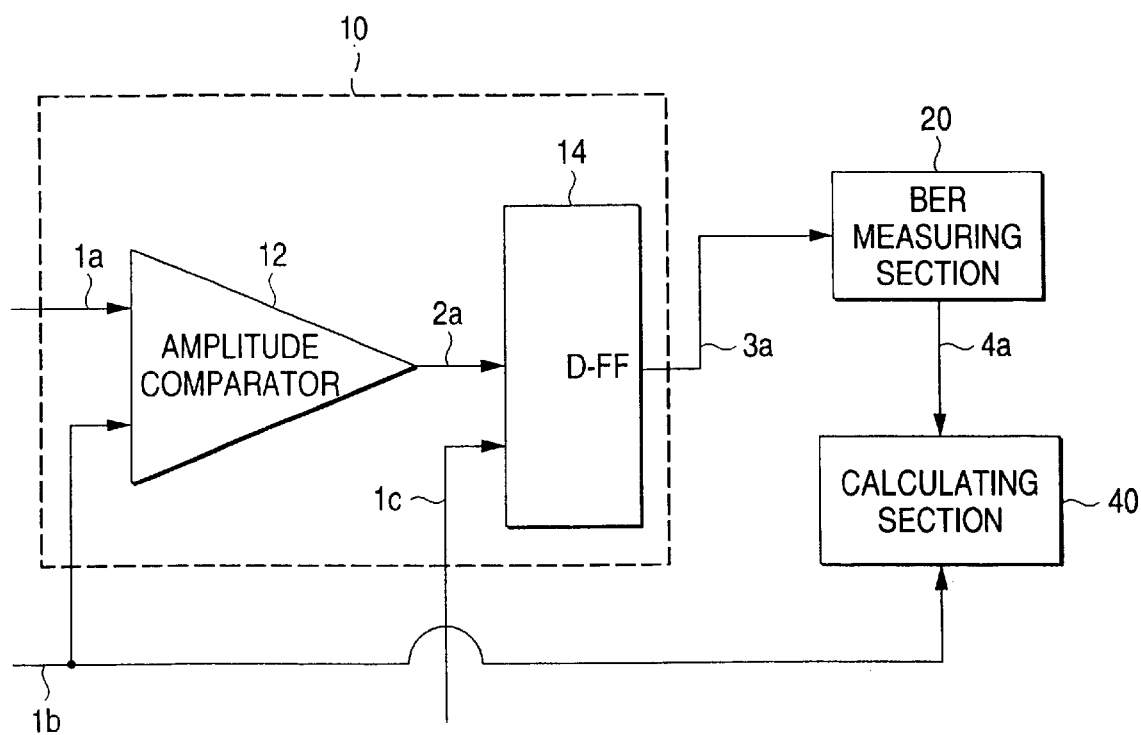
FIG. 2 is a block diagram showing the structure of the device of measuring the Q-value of the second embodiment of the present invention.

Next, FIG. 2 is an arrangement view showing a device of measuring a Q-value of the second embodiment of the present invention. In the drawing, the Q-value measurement device includes: a discriminating section 10 for sampling input data by a plurality of threshold value levels which are a little different from each other; a bit error rate measuring section 20 for measuring a bit error rate of input data according to a sampling output of the discriminating section 10; and a calculating section 40 for calculating the Q-value in real time when a bit error rate measured by the bit error rate measuring section 20 is taken in and also a threshold value level is taken in. The discriminating section 10 includes an amplitude comparator 12 and a data flip-flop (D-FF) 14.

In the device of measuring the Q-value of this embodiment of the present invention, unlike the device of measuring the Q-value of the first embodiment, it is unnecessary to provide a memory, because the Q-value is measured in real time. In FIG. 12, the discriminating section 10 corresponds to the input data discriminating means of the present invention. The bit error rate measuring means 20 corresponds to the bit error rate measuring means of the present invention. The calculating means 40 corresponds to the calculation means of the present invention.

In the device of measuring the Q-value of this embodiment of the present invention, the Q-value is measured as follows. The level 1a of an input signal is compared with the level threshold value 1b by the amplitude comparator 12. The comparative output step 2a is sampled by the data flip-flop (D-FF) 14 at the time of the clock signal 1c. The bit error measuring section 20 measures a bit error rate according to the sampled signal 3a and outputs a bit error rate 4a. In the calculating section 40, the following calculation is conducted according to the bit error rate 4a and the level threshold value 1b. A case is taken here as an example in which a distribution of the measured bit error rate is symmetrical, that is, in this case, $\sigma 0 = \sigma 1$, $\mu 0 < \mu 1$, $(\mu 1 - D)/\sigma 1 = (D - \mu 0)/\sigma 0$. When the distribution of the bit error rate is symmetrical, Formula 3, which is a defining formula the Q-value, is expressed by the following Formula 18.

$$Q = \frac{\mu_1 - D}{\sigma_1} = \frac{D - \mu_0}{\sigma_0} \quad (18)$$

Therefore, if $\mu 0$ and $\sigma 0$, or $\mu 1$ and $\sigma 1$ are found, the Q-value can be calculated. When a region from $\mu 0$ to $\mu 1$ is divided into (N+1) in such a manner that $\mu 0 \leq D1 < D2 < D3$, . . . , $<DN \leq \mu 1$ and the number of measuring points is determined to be N, it is assumed that there are at least n=i, i–1, i–2 which are Fn>0 continuously. That is, it is possible to continuously calculate $\Delta Gi0$ and $\Delta G(i-1)0$. At this time, the following Formula 19 can be obtained from Formula 16.

$$\frac{(Di + D(i-1))}{2} - \frac{D(i-1) + D(i-2)}{2} = -\sigma_0^2(=\Delta Gi0 - \Delta G(i-1)0) \quad (19)$$

Accordingly, standard deviation $\sigma 0$ can be found from $\Delta Gi0$ and $\Delta G(i-1)0$. Further, the following Formula 20 can be obtained from Formula 16.

$$\mu_0 = \frac{Di + D(i-1)}{2} + D\sigma_0^2 \cdot \Delta GnO \quad (20)$$

From Formula 20, $\mu 0$ can be found. Therefore, the Q-value can be found by Formula 18.

Figure 3:
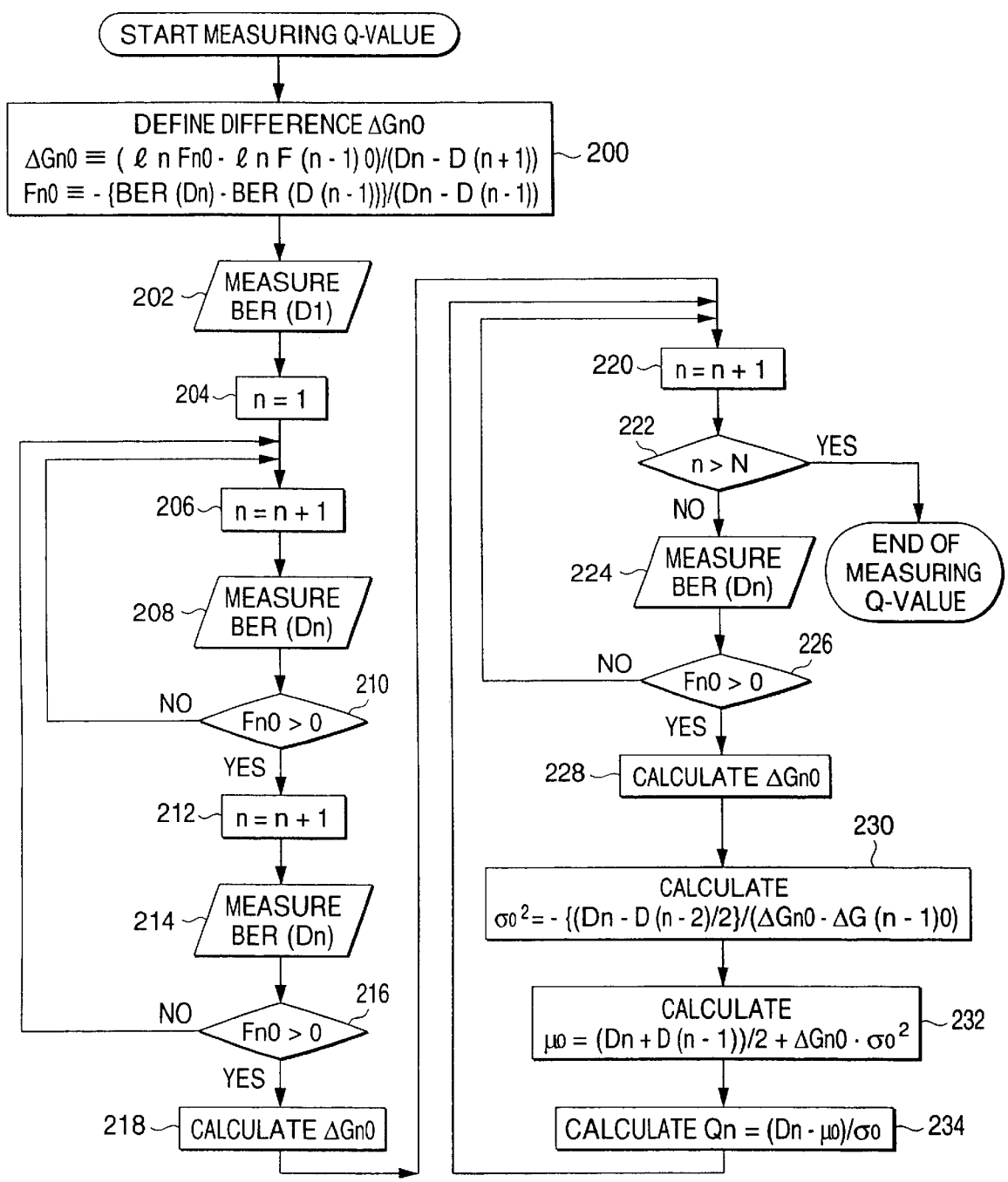
FIG. 3 is a flow chart showing the content of processing of the device of measuring the Q-value of the second embodiment of the present invention.
Figure 4:
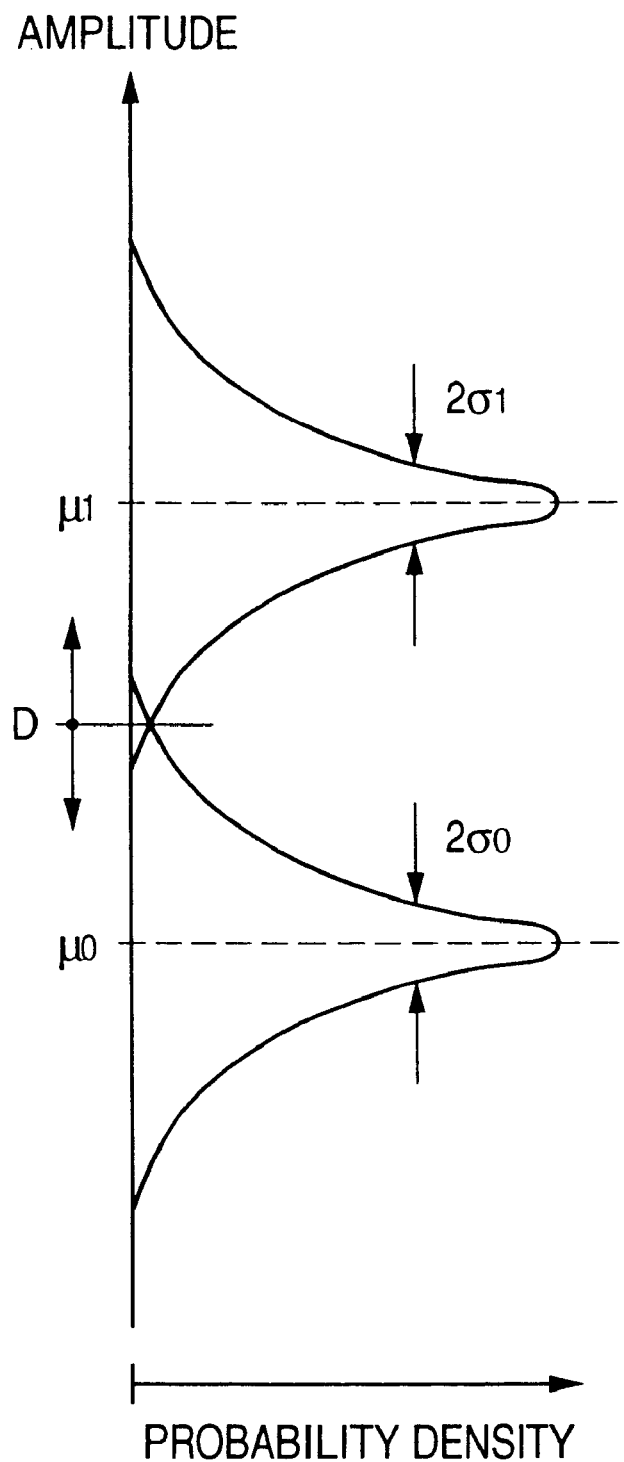
FIG. 4 is a schematic illustration showing a probability distribution of the input signal level.

Referring to FIG. 3, the above calculation is explained below. In step 200 shown in the drawing, difference $\Delta Gn0$ is defined according to Formulas 6 and 7. Next, in steps 202 to 210, the first value of Fn>0 is searched. Next, in steps 212 to 216, the second value of Fn>0 is searched. Due to the above series of processing, difference $\Delta Gn0$ is calculated for the first time in step 218.

Further, in steps 220 to 226, the third value of Fn>0 is searched. In step 228, the second difference $\Delta Gn0$ is calculated. With respect to the thus calculated two differences $\Delta Gn0$, simultaneous linear equations (Formulas 19 and 20), in which the square $\sigma 0^2$ of standard deviation $\sigma 0$ and the mean value $\mu 0$ are used as variables, are solved. Due to the foregoing, the square $\sigma 0^2$ of standard deviation $\sigma 0$ and the mean value $\mu 0$ are determined (steps 230 and 232). In step 234, the Q-value is calculated according to Formula 18.

The device of measuring the Q-value of the second embodiment of the present invention can provide the effect that the Q-value is measured in real time each time when the level threshold value Dn is changed, in addition to the effect provided by the first embodiment of the present invention. In this connection, in this embodiment, standard deviation $\sigma 0$ and mean value $\mu 0$ are found from two differences $\Delta Gn0$, and the Q-value is found from these values. However, it is possible to find the Q-value in such a manner that standard deviation $\sigma 1$ and mean value $\mu 1$ are found from two differences $\Delta Gn1$, and the Q-value is found from these values.

As explained above, according to the invention, the mean value and standard deviation of the input signal level are calculated from the measured bit error rate distribution by conducting a difference calculation between the data of measurement of the bit error rate without using the inverse function of the complementary error function. Accordingly, it is possible to reduce the number of times of calculation. Therefore, the measurement of the Q-value can be quickly carried out.

According to the invention, the method of measuring a Q-value of the present invention is used. Accordingly, it is possible to reduce the number of times of calculation. Therefore, the measurement of the Q-value can be quickly carried out.

What is claimed is:

1. A method of measuring a Q-value according to a mean value and standard deviation of a signal level distribution of input data comprising:
   a first step for calculating a difference between error rates of input data sampled by a plurality of threshold values which are a little different from each other;
   a second step for further calculating a difference between the difference data obtained in the first step; and
   wherein the Q-value is calculated without using the inverse function of the complementary error function.

2. A method of measuring a Q-value according to a mean value and standard deviation of a signal level distribution of input data comprising:
   a first step for calculating a difference between bit error rates of input data sampled by a plurality of threshold values which are a little different from each other;
   a second step for further calculating a difference between the difference data obtained in the first step;
   a third step for calculating a mean value and standard deviation of the signal level of input data when data obtained in the first and the second step are utilized; and
   wherein the Q-value is calculated without using the inverse function of the complementary error function.

3. A method of measuring a Q-value according to a mean value and standard deviation of a signal level distribution of input data comprising:
   a first step for calculating a difference between bit error rates of input data sampled by a plurality of threshold values which are a little different from each other;
   a second step for calculating a difference between the difference data obtained in the first step;
   a third step for calculating a mean value and standard deviation of the signal level of data input by the method of least squares when data obtained in the first and the second step are utilized; and
   wherein the Q-value is calculated without using the inverse function of the complementary error function.

4. A method of measuring a Q-value according to a mean value and standard deviation of a signal level distribution of input data comprising:
   a first step for calculating a difference between bit error rates of input data sampled by a plurality of threshold values which are a little different from each other when a standard deviation of input data of level "0" and a standard deviation of input data of level "1" are equal to each other in the signal level distribution of input data;
   a second step for further calculating a difference between the difference data obtained in the first step;
   a third step for calculating a mean value and standard deviation of the signal level of input data by solving simultaneous linear equations of two variables when data obtained in the first and the second step are utilized; and
   wherein the Q-value is calculated without using the inverse function of the complementary error function.

5. A device of measuring a Q-value according to a mean value and standard deviation of a signal level distribution of input data comprising:
   an input data discrimination means for sampling input data by a plurality of threshold levels which are a little different from each other;
   a bit error rate measuring means for measuring a bit error rate of input data according to a sampling output of the input data discrimination means;
   a calculation means for taking in bit error rates of input data measured by the bit error rate measuring means, for calculating a difference between the bit error rates and for calculating a difference between the thus calculated difference data; and
   wherein the Q-value is calculated without using the inverse function of the complementary error function.

6. A device of measuring a Q-value according to claim 5, wherein the calculation means calculates a difference between the error rates of input data, further calculates a difference between the calculated difference data, and calculates a mean value and standard deviation of the signal level distribution of input data by utilizing the difference data and also by utilizing the data obtained when the difference data is subjected to difference calculation.

7. A device of measuring a Q-value according to claim 5, wherein the calculation means calculates a difference between the error rates of input data, further calculates a difference between the calculated difference data, and calculates a mean value and standard deviation of the signal level distribution of input data by the method of least squares by utilizing the difference data and also by utilizing the data obtained when the difference data is subjected to difference calculation.

8. A device of measuring a Q-value according to a mean value and standard deviation of a signal level distribution of input data comprising:
   an input data discrimination means for sampling input data by a plurality of threshold levels which are a little different from each other;
   a bit error rate measuring means for measuring a bit error rate of input data according to a sampling output of the input data discrimination means;
   a calculation means for taking in bit error rates of input data measured by the bit error rate measuring means, for calculating a difference between bit error rates of input data sampled by a plurality of threshold values which are a little different from each other when a standard deviation of input data of level "0" and a standard deviation of input data of level "1" are equal to each other in the signal level distribution of input data, for calculating a difference between the obtained difference data, and for calculating a mean value and standard deviation of the signal level distribution of input data by solving simultaneous linear equations by utilizing the difference data and also by utilizing the data obtained when the difference data is subjected to difference calculation; and wherein the Q-value is calculated without using the inverse function of the complementary error function.

* * * * *